April 4, 1967   G. D. MANVILLE   3,311,988
LEVEL AND STRAIGHT-EDGE COMBINATION
Filed July 13, 1964   3 Sheets-Sheet 1
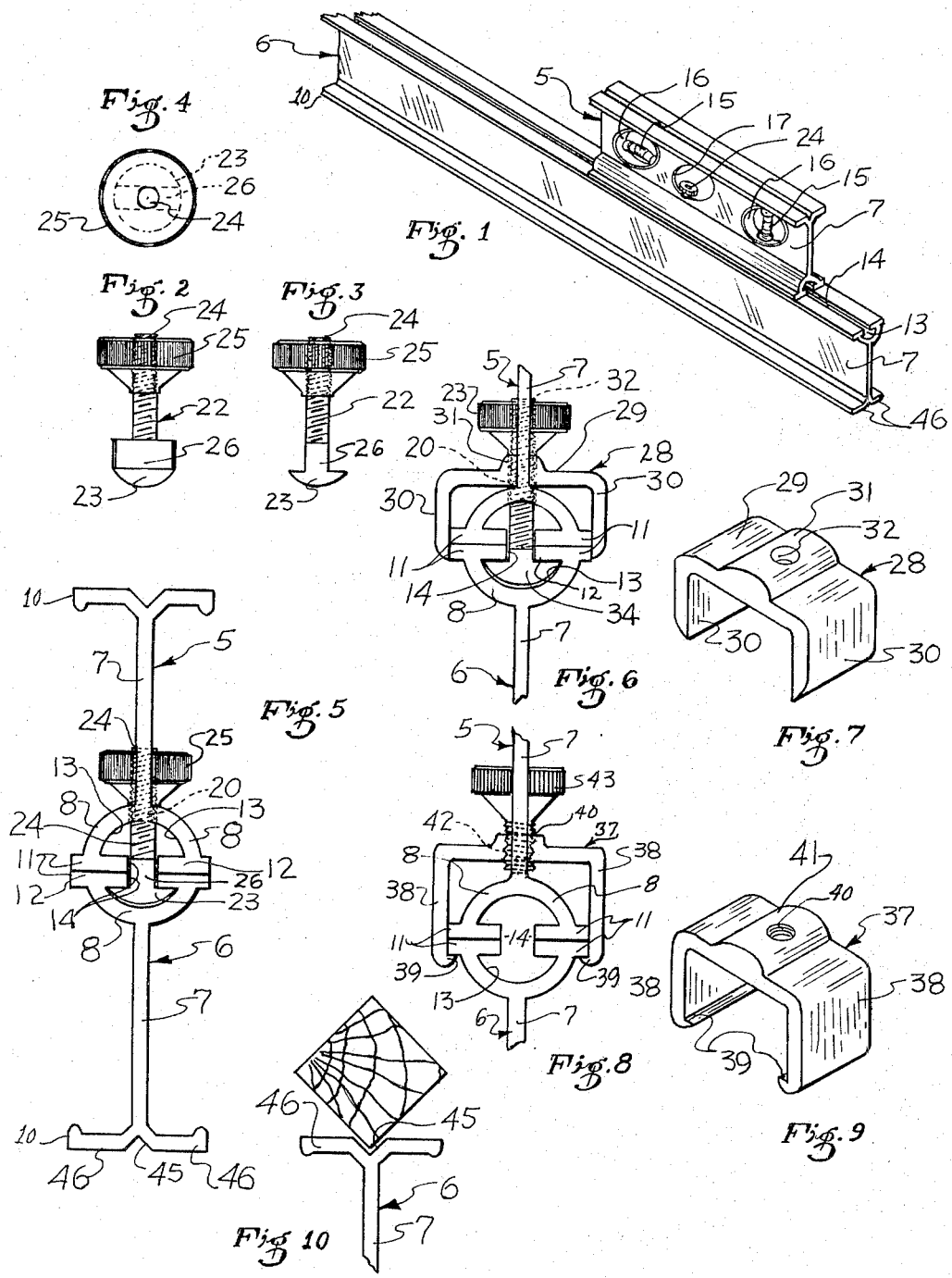
GEORGE DEWEY MANVILLE
INVENTOR

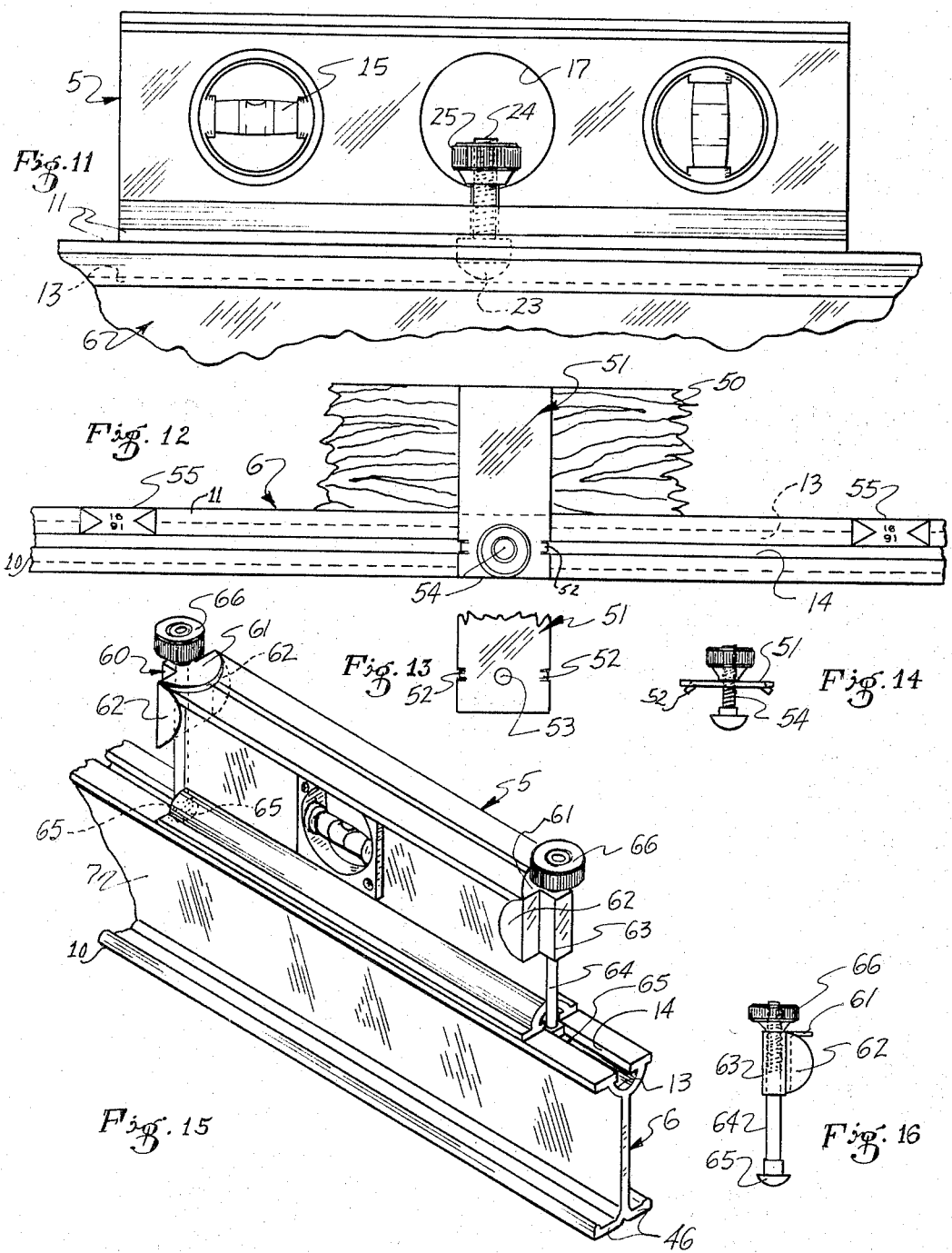

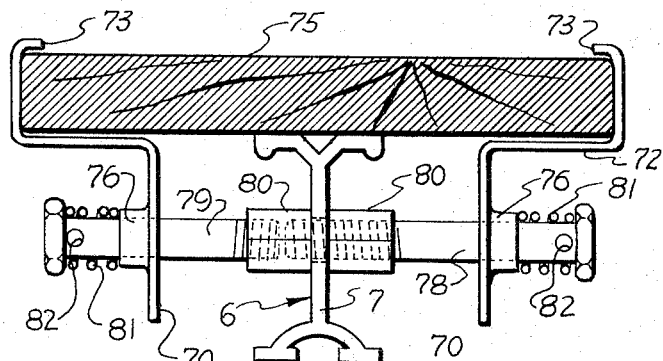
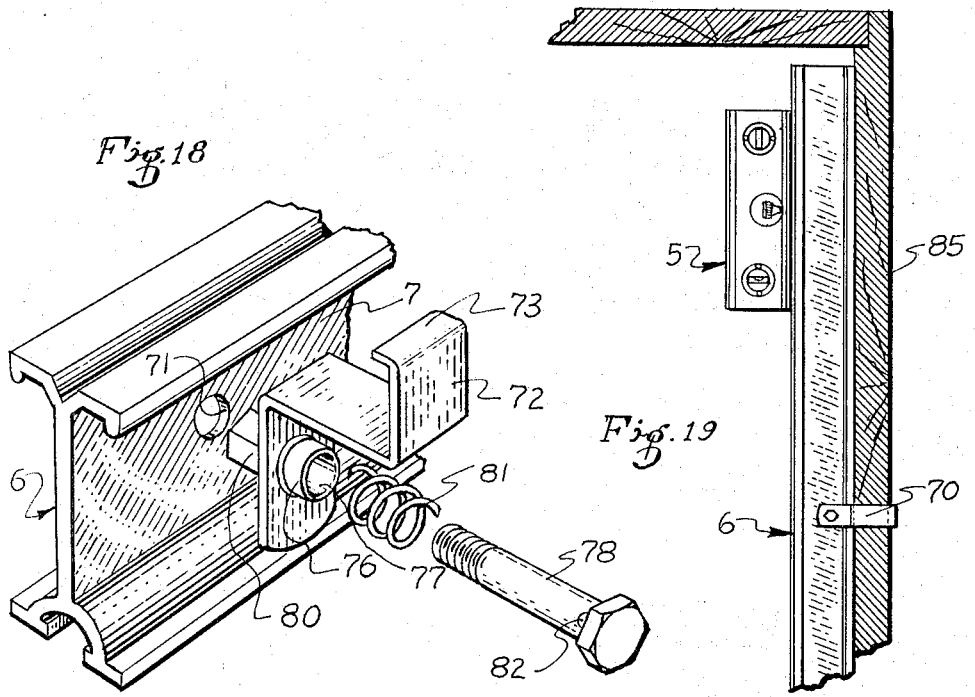

United States Patent Office 3,311,988
Patented Apr. 4, 1967

3,311,988
LEVEL AND STRAIGHT-EDGE COMBINATION
George Dewey Manville, 35211 Adams Lane,
Yucaipa, Calif. 92399
Filed July 13, 1964, Ser. No. 382,122
8 Claims. (Cl. 33—207)

My invention relates to a combination level and straight-edge gage and more particularly to a level and straight-edge combination fabricated from a single extrusion of novel cross-section having an edge profile formed in such a way that the level and straight-edge elements can be interlockingly assembled along their edges and relatively slidable thereon.

A serious disadvantage found in prior levels and straight-edge gages fabricated of wood or wood incased or partially sheathed in sheet metal is that once the sheet metal is accidently dented, bent or twisted out of alignment, it is difficult and often impossible to restore the gage to accuracy. Sheet metal and wood is highly susceptible to damage under normal rough handling on construction jobs.

Straight-edge gages, levels, and like tools fabricated of aluminum or magnesium, on the other hand, are lightweight, resistent to denting, bending or twisting, and are relatively easy to true up and restore to accuracy as is required from time to time.

Levels that also function as straight-edge gages are available in lengths ranging from 3 feet to 12 feet, being equipped between their ends with a number of spaced spirit level vials. However such levels have proven to be generally impractical due to the number of expensive vials necessary in the 6 foot and over gages along with the frequent necessity of replacing vials broken during use. Moreover, it is a tedious and time-consuming task to remove all of the vials when it becomes necessary to true up and restore the gage to accuracy, an operation that requires a certain amount of hammering upon sections of the gage against a solid base such as an anvil.

Hence, not only is it desirable to manufacture levels and straight-edge gages for separate and independent use, but also to provide for combing the two gages together for simultaneous use. In such combinations it is possible to store the detachable level, which can be made in relatively short lengths, in a protective case or box. It will be appreciated that a short level attached to a long straight-edge accomplishes the same purpose as a long level that commonly employs as many as 10 spirit level vials. Furthermore, it is well-known that spirit level vials are adversely affected upon constant exposure to weather and should be enclosed in a protective case or box when not in use.

It is also to be noted that in prior combinations the locking means for joining the level gage and straight-edge together tend to be awkward to manipulate, in many cases cumbersome, and invariably utilize fastening means that protrude outwardly beyond the profile of the combination and can thus get in the way of the user.

Quite frequently a workman using a level and straight-edge combination finds it necessary to temporarily tie or fasten the gage to the structural member being plumbed and leveled using wire or nails driven into the member and bent around the gage for support thereof. This leaves the workers hands free to install shims, screws, etc., necessary to properly install the member accurately in respect to the other structure. However such temporary fastening practices are altogether unsatisfactory, being crude, inconvenient, and time-consuming; and often result in nicking or otherwise damaging the truing edges and gaging surfaces of the precision gage.

In view of the foregoing history it is a primary object of my invention to provide a novel level and straight-edge combination and highly functional extrusion of unique cross-section from which both elements of the combination is fabricated, the resultant gage combination incorporating all of the features found in prior gages of the same general kind that are usually characterized by relatively complicated construction.

It is another primary object of my invention to provide a versatile level and straight-edge gage that is lightweight yet durable and relatively easy to maintain in accurate condition despite normal rough handling and use.

It is still another object of the above invention to provide a novel combination level and straight-edge gage characterized by means for slidably joining or locking the two elements together wherein the means is neatly recessed within the edge surfaces of the gages leaving all edges and surfaces unencumbered and free of protuberances.

It is a still further object of my invention to provide a novel and highly functional spring-biased clamp in combination with the level and straight-edge by which means the combination can be quickly and simply secured to a structural member being plumbed and leveled, leaving both hands of the user free for other tasks.

And it is another object of my invention to provide in combination with the straight-edge gage, means for marking off centers on studs, sills, plates, etc., the marking means being slidably attached along the attachment edge of the gage and movable from point to point and registerable with indicia provided along an edge thereof.

Other objects and advantages inherent in my invention will be self-evident in the ensuing specification.

Briefly, the elongated extrusion with the novel cross-sectional shape making possible the foregoing objects and advantages comprises a relatively thin web formed on one of its edges with a pair of coextensive flanges arranged to define a continuous receptable and continuous slot opening thereinto that accommodates novel slidable fastening means mounted therein, the opposite edge of the web being provided with straight-edge gaging means. Combined with the foregoing gage means are provided to temporarily clamp the combination to a structural member being gaged and mark off centers while the gage combination is so held.

The gist and spirit of my present invention will be more clearly understood by reference to the enusing specification and drawings wherein:

FIGURE 1 is a perspective view of a level and straight-edge combination constructed and arranged according to my invention.

FIGURE 2 is a side elevational view of a specially designed bolt with which the level and straight-edge gages of FIGURE 1 are slidably assembled together.

FIGURE 3 is an end elevational view showing the special slide bolt of FIGURE 2 rotated 90°.

FIGURE 4 is a partially phantom view taken from the upper end of the fastener of FIGURES 2 and 3.

FIGURE 5 is an end view of the combination shown in FIGURE 1 taken from either end, showing the typical installation of the special slide bolt of FIGURES 2, 3 and 4.

FIGURE 6 is an enlarged fragmentary end elevational view of the level and straight-edge combination of FIGURE 1 showing the use of a standard type of bolt in combination with a special bracket.

FIGURE 7 is a perspective view of the special bracket shown in FIGURE 6.

FIGURE 8 is a fragmentary partially phantom view showing an alternative bracket and bolt combination interlockingly joining the level and straight-edge engages together edge to edge.

FIGURE 9 is a perspective detail view of the bracket shown in FIGURE 8.

FIGURE 10 is a fragmentary end view showing the straight-edge provided on the edge opposite the attachment edge of the combination shown in FIGURE 1.

FIGURE 11 is a partially fragmentary side elevational view of the combination shown in FIGURE 1.

FIGURE 12 is a fragmentary edge view showing a marking blade mounted in the attachment edge of the straight-edge gage of my invention.

FIGURE 13 is a fragmentary plan view of the marking blade of FIGURE 12.

FIGURE 14 is an end elevational view of the marking blade with the slide bolt installed.

FIGURE 15 is a fragmentary view in perspective of still another means for interlockingly assembling the level and straight-edge gages of the foregoing figures.

FIGURE 16 is a side elevational view of the end bracket and fastener shown in FIGURE 15.

FIGURE 17 is an end elevational view showing spring-loaded means adapted to clamp the gage combination to a board that is being plumbed and leveled.

FIGURE 18 is an exploded view in perspective of the parts forming the clamp of FIGURE 17.

FIGURE 19 is a side elevational view showing the level and straight-edge combination clamped to the jamb of a door frame.

In FIGURES 1 and 5 the level 5 and straight-edge 6 are each fabricated from an extrusion of lightweight, corrosion-resistant, rigid and durable material such as aluminum or magnesium for example. As best shown in the end view of FIGURE 5, the shape of the extrusion includes a web 7 having one edge thereof divided into a pair of outwardly divergent legs 8 that define between them a continuous receptacle 13, each leg 8 terminating in coextensive outer flanges 11 and inner flanges 12. The receptacle 13 between the inner flanges 12 of legs 8 communicates with a continuous slot 14 that extends along the entire edge of extrusion 10; having a twofold purpose as will be described below.

Referring to FIGURE 1, the level 5 is provided with spirit vials 15 mounted in the customary manner in generally circular apertures 16 cut through web 7. One of the apertures 17, preferably located between the horizontal and vertical gages 15, is reserved for fastening means to interlockingly join the level 5 with the straight-edge 6. A bore 20 is drilled in the edge of the aperture 17 normal to the axis of extrusion 10 and into receptacle 13 between legs 8, preferably exactly centered with respect thereto.

A specially designed bolt 22 is mounted with its head 23 in receptacle 13, the bolt shank 24 extending up through bore 20 and into the aperture 17 in level 5 where a knurled nut 25 is threaded onto the projecting end of bolt shank 24 and tightened against the lower edge of aperture 17 to interlockingly join the two gage elements 5 and 6 together. Bolt 22 is characterized by a flattened throat 26, the width through the cross-section, which is generally rectangular, being dimensioned to provide a sliding fit between the aligned slots 14 of gages 5 and 6 abutted edge to edge as shown in FIGURES 1 and 5 wherein it can be seen that when bolt head 23 of bolt 22 is installed in receptacle 13, throat 26 extends through aligned slots 14 with a sliding fit preventing relative twisting or turning between level 5 and straight-edge 6.

In FIGURES 6–8, I show two different forms of U-shaped brackets that can be employed to keep the level 5 and straight-edge 6 aligned along their mutual attachment edges.

The bracket 28 in FIGURES 6 and 7 is formed with a contoured bight 29 having parallel legs 30, a relatively thicker contoured portion 31 being provided on the upper surface of bight 29, and a central bore 32. The bracket 28 is mounted in the aperture 17 of the level 5 with the bore 32 in precise alignment with the aperture bore 20; the bracket legs 30 straddling the outer ends of the outer flanges 11 on the level edge and extending at least the width of the pair of abutting flanges 11.

The head of a standard bolt 34 is engaged in receptacle 13 between legs 8 and inner flanges 12, the shank of bolt 34 extending through aligned slots 14, bore 20 through to aperture 17 and the aligned bracket bore 32. A knurled nut 23 is mounted on the end of the bolt shank that projects into aperture 17 in the same manner as in the foregoing figures.

If desired a modified bracket 37 as shown in FIGURES 8 and 9 may be used, the ends of bracket legs 38 being provided with inturned hooks or flanges 39 to afford a more positive clamping action around the abutting flanges 11 of the assembled level 5 and straight-edge 6. As an alternative a bore 40 through the bight 41 of bracket 37 is threaded to receive and retain a threaded bolt 42 having a knurled head 43. The bracket 37 is positioned in aperture 17 of level 5 with legs straddling the abutting ends of outer flanges 11. It can thus be seen that as bolt 42 is turned in threaded bore 40 of bracket 37 the bolt end bears against the edge of aperture 17, the bracket thereby moving upwardly on the shank of bolt 42 and raising the inturned flanges 39 to firmly clamp abutting flanges 11 of the level 5 and straight-edge 6 tightly together as shown in FIGURE 8.

It will be noted in some of the figures and particularly in FIGURE 10 that a V-groove 45 can be provided along the straight-edge of web 7 of each of the elements 5 and 6, the function of the V-groove, which is preferably centered between the ends of flange 46, being well-known in the art; to enable the straight-edge to be placed in self-centering engagement with corners of posts, pipes, edges of joists, jambs and the like, for plumbing purposes.

A typical position for reading level gages is shown in FIGURE 11 wherein the special slidable lock bolt 22 with the flattened throat 26 is used.

Another valuable use of the straight-edge gage 6 fabricated according to the cross-sectional shape of extrusion 10 is shown in FIGURE 12 wherein the straight-edge 6 is placed firmly against a structural member 50 with the edge of outer flange 11 thereagainst. Here a marking blade 51 comprising a flat generally rectangular member, made of steel for example, is provided with a pair of opposed register tabs 52 cut on opposite edges of the member 51 and angularly bent downwardly to partially enter and ride in slot 14 of straight-edge 6. A hole 53 is drilled through member 51 midway between tabs 52 through which a lock bolt 54 is mounted with the bolt head captured in receptacle 13 similar to the mounting of the slide bolt of the level 5 and straight-edge 6 of the previous figures.

Any desired indicia, represented somewhat as shown at 55, can be printed or engraved along the outer edge of either flange 11 of straight-edge 6 marking the positions to be registered with the marking edge of marking blade, the blade being movable from position to position as is commonly done in laying out 16 inch centers for studs, joists, girders, etc., for example.

Still another manner in which a level and straight-edge can be interlockingly joined edge to edge is shown in FIGURE 15 wherein a novel bracket 60 is formed with a top flange 61 and side flanges 62 bent to extend at right angles from a rectangular sleeve 63 having threaded therethrough a relatively long bolt 64 terminating at one end thereof with a head 65 that has a sliding fit in receptacle 13 along the attachment edge of straight-edge 6, and on its other end with a knurled nut 66. The level 5 is placed attachment edge to attachment edge with straight-edge 6 with brackets 60 at each end, the flanges 61 and 62 fitting around and over the ends of level 5 and tightened in edge to edge relationship by knurled nut 66.

With brackets 60 of FIGURES 15 and 16 it is possible to mount a common variety of level having the conventional rectangular cross-section, or I-beam cross-section, to the attachment edge of the straight-edge 6 formed of extrusion 10 described above.

As a further feature of the level and straight-edge combination of my present invention, I provide a novel clamp 70 that is adapted to be mounted on the straight-edge gage 6 through a small bore 71 drilled through the straight-edge web 7, the clamp 70 being shown in FIGURES 17–19.

The clamp 70 comprises a pair of angularly formed arms 72, one positioned on each side of web 7, the arms 72 being characterized by portions thereof extending parallel with web 7 then bent at right angles to web 7 and outwardly to define portions coextensive with the surface of a structural member to which the combination is clamped, then bent again in a direction parallel with web 7 and terminating with small inturned hooks or flanges 73 that fit around the edges or ends of the structural member 75. The parallel portions of arms 72 adjacent to web 7 are provided with bosses 76 each having a bore 77 therethrough to accommodate fastening bolts 78 and 79 of generally conventional configuration. On the inner ends of bolts 78 and 79 hexagonal interiorly threaded sleeves 80 are mounted, the inner ends of which abut opposite sides of web 7. The shank of the bolt 79 on one side of web 7 must be made appreciably shorter than bolt 78 but long enough to enter and threadably engage the outer end of the hexagonal sleeve 80 on the same side of the web 7, a sufficient distance to ensure stability while the shank of arm bolt 78 on the opposite side of web 7 is made sufficiently long to pass entirely through its respective hexagonal sleeve 80 and extend through web bore 71 and threadably engage the sleeve 80 on the opposite side of web 7 in which arm bolt 79 is engaged. It can be seen that arm bolts 78 and 79 are locked together from opposite sides of straight-edge web 7 in coextensive relationship.

Holes 82 drilled through the shanks of bolts 78 and 79 adjacent to their heads may be provided as a simple means of tightening or loosening with a nail or nailset, for example.

Between bosses 76 of arms 72 and the beads of arm bolts 78 and 79 I provide compression springs 81 each bearing at one end thereof against the bosses 76 and at their other ends against the heads of bolts 78 and 79 to bias the arms 72 inwardly toward web 7 on each side of straight-edge 6.

To mount and dismount straight-edge 6 from a structural member such as a jamb or the like, all that is necessary is to move arms 72 of clamp 70 outwardly and away from each side of web 7, against the pressure of springs 81. When released, it will be seen that the clamping arms 72 are urged by springs 81 against the side edges of the structure 75.

As shown in FIGURE 19 the clamp 70 is ideally suited for finish as well as rough carpentry and construction work, a level 5 and straight-edge 6 combination being used in plumbing and leveling a door frame, the combination being clamped to a member representing a jamb 85 by means of clamp 70 freeing the user's hands for adjusting, shimming and nailing.

While the extruded metal structure, level and straight-edge fabricated therefrom, attachment means and other elements of the combination described above have been set forth with reference to specific embodiments herein, other modifications, embodiments and applications will readily occur to persons skilled in the art. It is to be understood that my invention may be so modified and applied without departing from the spirit and scope of the appended claims.

Having thus described my invention, what is claimed and desired by Letters Patent is:

1. A manufacture of the character described comprising:

(a) an elongated extrusion having a web bounded on one edge thereof with a pair of spaced apart legs defining between them a continuous receptacle, each of said legs terminating in coextensive flanges normal to the axis of said web and partially enclosing said receptacle, (b) a continuous slot opening into said receptacle defined between the inner ends of said flanges, (c) means defining a straight-edge gaging surface on the opposite edge of said web and flanges extending outwardly of said web normal thereto, (d) a second relatively short length of the same shape as said elongated extrusion being provided with at least one level gaging means, (e) the relatively long length of said extrusion being suitably adapted to gage the straightness of a surface engaged thereby, said short length of said extrusion being slidably attachable to said long length extrusion edge to edge with said continuous slots in alignment, (f) locking means mounted in the receptacle of one of said members and extending through said aligned slots to slidably engage the other and adapted to lock and unlock said extrusions for relative movement therebetween, and (g) means for attaching said extrusion to the surface of a structure to be gaged.

2. A level and straight-edge gage combination formed from an elongated extrusion characterized by a web of relatively thin section, one edge of said web being bifurcated to define a pair of divergently extending legs, the space between the inner surfaces of said legs defining a continuous receptacle extending the length of said extrusion, each of said legs terminating in laterally disposed coextensive flanges extending outwardly and inwardly of said legs to partially enclose said receptacle, a relatively narrow space between the inner ends of said flanges defining a continuous slot opening into said receptacle, the opposite edge of said extrusion terminating in a flange extending laterally across said web, said flange being adapted to engage and gage the straightness of a surface, a relatively long length of said extrusion being adapted to gage the straightness of a surface, and a relatively short length of said extrusion being provided with at least one level gaging means, said long length of extrusion and short length of extrusion being placed together with their bifurcated edges placed together in abutting relationship with their edge slots in alignment, connecting means joining said extrusions together comprising:

(a) a bolt positioned with its head slidably retained in said continuous receptacle of said straight-edge gage, the shank of said bolt extending through said aligned slots to connecting means in said level gage, the shank of said bolt adjacent to its head being shaped to prevent turning thereof in said slots and maintaining the edges of said level gage and said straight-edge in alignment along their respective edges, said connecting means being adjustable so that said gages can be locked and unlocked for relative movement of said level gage along the edge of said straight-edge gage, and (b) a pair of spring-loaded clamping members, one extending from each side of said straight-edge gage and having terminal flanges to clamp a structural member to be gaged, said clamping members being movable against spring means for engagement and disenagement with said structural member.

3. The combination according to claim 2 wherein said shank of said bolt adjacent to said head is substantially rectangular in cross-section, the distance across the narrow side being slightly less than the width of said aligned slots, the distance across the long side being greater than the width of said aligned slots.

4. A level and straight-edge combination according to claim 2 wherein said connection means includes a U-shaped bracket mounted in said level, the bight of said bracket having a bore to receive the bolt in the receptacle of said straight-edge, the legs of said bracket straddling the outer ends of the abutting flanges of said level and straight-edge to prevent relative lateral misalignment therebetween.

5. A level and straight-edge combination according to claim 4 wherein said U-shaped bracket is provided with legs terminating in small inturned flanges that grip said abutting flanges of said level and straight-edge preventing relative misalignment therebetween, and a bolt associated with said bracket and said level and adapted to tighten and loosen said inturned leg flanges with respect to said abutting flanges of said combination.

6. A straight-edge member in accordance with claim 2 that includes marking means engageable in said continuous receptacle and movable therealong, and indicia provided adjacent the slot of said receptacle indicating predetermined measurements to be registered with said marking means.

7. A straight-edge member according to claim 6 wherein said marking means comprises an accurately dimensioned substantially rectangular blade having angularly bent tabs engageable in the edge slot of said straight-edge, and a bolt retained in the receptacle of said straight-edge to lock and unlock said marking blade for movement along said edge slot for registration with said indicia.

8. A manufacture of the character described comprising an elongated extrusion having a web of relatively thin section, one edge of said web being bifurcated to define a pair of divergently extending legs, the space between the inner surfaces of said legs defining a continuous receptacle extending along the edge of said receptacle, each of said legs terminating in laterally disposed coextensive flanges extending outwardly and inwardly of said legs to partially enclose said receptacle, a relatively narrow space between the inner ends of said flanges defining a continuous slot opening into said receptacle, the opposite edge of said extrusion terminating in a flange extending laterally across said web, said flange being adapted to engage and gage the straightness of a surface, a relatively long length of said extrusion being adapted to gage the straightness of a surface and a relatively short length of said extrusion being provided with at least one level gaging means, said long length of extrusion and said short length of extrusion being placed together with their bifurcated edges placed together in abutting relationship with their edge slots in alignment, connecting means joining said extrusions together comprising:

(a) a bolt mounted in said long extrusion at each end of said short extrusion with its head slidably retained in said continuous receptacle, the shank of said bolt extending through said continuous slot normal to the axis of said receptacle, (b) a sleeve mounted on said extended bolt shank and having outwardly projecting tabs extending around the ends of said short extrusion on at least three sides thereof to firmly clamp said short extrusion in said edge to edge relationship, and (c) a nut threaded onto the ends of said bolt shanks adjacent to said sleeve to tighten and loosen said brackets whereby said short extrusion is slidably movable between fixed positions along said long extrusion.

References Cited by the Examiner

UNITED STATES PATENTS

| | | | |
|---|---|---|---|
| 991,603 | 5/1911 | Brooks | 52—729 X |
| 1,041,622 | 10/1912 | Guifoyle | 32—207 |
| 1,620,469 | 3/1927 | Kirkhoff | 33—211 |
| 2,092,210 | 9/1937 | Greulich | 52—729 X |
| 2,133,605 | 10/1938 | Wikstrom | 33—207 X |
| 2,694,861 | 11/1954 | Zelnick | 33—207 X |
| 2,993,281 | 7/1961 | Dock | 33—213 X |
| 3,243,888 | 4/1966 | Redding | 33—208 |

LEONARD FORMAN, *Primary Examiner.*

L. V. ANDERSON, *Assistant Examiner.*